(12) United States Patent
Nethercot et al.

(10) Patent No.: US 12,487,831 B2
(45) Date of Patent: Dec. 2, 2025

(54) SYSTEMS AND METHODS FOR MANAGING ORDER OF COMMAND PROCESSING

(71) Applicant: Xilinx, Inc., Santa Jose, CA (US)

(72) Inventors: Mark Richard Nethercot, Edinburgh (GB); Martin Rhodes, Edinburgh (GB); Ricardo Gonzalez Toral, Edinburgh (GB); Colin Stirling, Edinburgh (GB); Dmitri Kitariev, Irvine, CA (US); David Riddoch, Cambridge (GB)

(73) Assignee: Xilinx, Inc., Santa Jose (CA)

( * ) Notice: Subject to any disclaimer, the term of this patent is extended or adjusted under 35 U.S.C. 154(b) by 11 days.

(21) Appl. No.: 18/345,994

(22) Filed: Jun. 30, 2023

(65) Prior Publication Data
US 2025/0004782 A1    Jan. 2, 2025

(51) Int. Cl.
*G06F 9/30* (2018.01)
*G06F 9/38* (2018.01)

(52) U.S. Cl.
CPC .......... *G06F 9/3856* (2023.08); *G06F 9/3836* (2013.01)

(58) Field of Classification Search
CPC .............................. G06F 9/3856; G06F 9/3836
See application file for complete search history.

(56) References Cited

U.S. PATENT DOCUMENTS

| | | | |
|---|---|---|---|
| 9,558,001 B2 * | 1/2017 | Khot | G06F 9/3836 |
| 10,001,997 B2 * | 6/2018 | Khot | G06F 9/3016 |
| 2013/0297912 A1 * | 11/2013 | Tran | G06F 9/3885 |
| | | | 712/E9.028 |
| 2017/0315812 A1 * | 11/2017 | Smith | G06F 9/3854 |

* cited by examiner

*Primary Examiner* — Corey S Faherty
(74) *Attorney, Agent, or Firm* — Greenberg Traurig, LLP (57) ABSTRACT

A computer-implemented method for managing processing order for a plurality of commands can include in response to receiving each command of a plurality of commands in a receipt order, assigning each respective command of the plurality of commands to a respective processing queue of a plurality of processing queues to be processed, and setting, for each of the plurality of commands and in the receipt order, an identifier based on the respective queue assigned to each of the plurality of commands, and managing, based on the identifiers for each of the plurality of commands in the receipt order, an order of processing of each of the plurality of commands from the respective processing queue of the plurality of processing queues. Various other methods, systems, and computer-readable media are also disclosed.

19 Claims, 6 Drawing Sheets

SYSTEMS AND METHODS FOR MANAGING ORDER OF COMMAND PROCESSING

BACKGROUND

Some processing units can include different processing paths with different capabilities and/or functionalities, which can include different hardware components. As a result of the different capabilities/functionalities, different commands can be more or less efficiently processed by different processing paths or can be able to be executed on some processing paths and not on other processing paths.

BRIEF DESCRIPTION OF THE DRAWINGS

The accompanying drawings illustrate a number of example implementations and are a part of the specification. Together with the following description, these drawings demonstrate and explain various principles of the present disclosure.

Throughout the drawings, identical reference characters and descriptions indicate similar, but not necessarily identical, elements. While the example implementations described herein are susceptible to various modifications and alternative forms, specific implementations have been shown by way of example in the drawings and will be described in detail herein. However, the example implementations described herein are not intended to be limited to the particular forms disclosed. Rather, the present disclosure covers all modifications, equivalents, and alternatives falling within the scope of the appended claims.

DETAILED DESCRIPTION

Described herein are examples of systems and methods for managing order of command processing. Some implementations described herein can include receiving multiple commands to be processed, which are received in a receipt order. Each command can then be assigned to a processing queue, of a set of multiple processing queues, for processing. Such processing queues can be associated with processing paths of a processing unit. Assigning a command to a processing queue can be associated with assigning the command to the processing path. Examples of factors that can be used in assigning commands to processing paths/queues are discussed below, but it should be appreciated that implementations are not limited to any particular manner of assignment. In some cases, commands can be assigned to a processing path that can be able to process the command where other processing paths cannot, or that can be adapted to process the command in a different manner (e.g., more efficiently than) other processing paths.

An identifier can also be set, for a command, indicating the processing queue and/or processing path to which the command was assigned. In some implementation, a queue of such identifiers can be maintained, which can include the identifiers for the processing queues in an order matching the receive order of the commands. Subsequently, processing of commands in the processing queues can be managed based on the identifiers, such that the commands are processed, across the different queues, in an order corresponding to the receive order of the commands.

A processing unit, such as an integrated circuit able to execute instructions or other processing unit, can receive commands to be processed. Such processing can include executing the command in a case that the command is one or more executable instructions, can include executing instructions indicated by the command, can include conveying the command or data to a particular destination (inside or outside the processing unit, or to an interface of the processing unit), or can include other processing of the command. In some cases, each of the commands can be associated with data to be processed as a part of processing the commands, such as in a case that a command indicates an operation to be performed on or with data. In some cases, the data can be a message, or the command and data can be received together with a message.

In a case that a processing unit (e.g., a circuit) has a number (e.g., four) of separate processing paths for processing received commands, it can be the case that each is associated with an arbiter that selects when to provide to a processing path a next command for processing and/or selects which command from a queue to provide to the processing path for processing.

In some cases, multiple commands can be associated with the same or related data, such as in a case that a sequence of operations is to be performed on data. Accordingly, it can be helpful that commands be processed in a particular order, for example, the order in which the commands are received. If there is a temporal relationship between commands or other relationship between commands or data, circumstances can arise in which processing commands in a different order could lead an incorrect result of a set or sequence of commands.

In processing units that include multiple processing paths and in which commands are assigned to different processing paths for processing, it can arise that different processing paths can have different latencies or utilization. For example, delays in one processing path can cause the commands in that path from progressing for multiple clock cycles while the other commands are processed freely via other processing paths. As a result, commands that together but assigned to different processing paths could end up being processed in an order different than the one in which the commands were received, which could lead to issues such as data errors mentioned above.

As another example of difficulties that could arise, if a command to be processed by a processing path is dependent on data that is being processed by a different command in a different processing path, that command can hold waiting for the data to become available. That hold would mean time wasted that a processing path could spend processing other commands, which can reduce overall efficiency of processing. If a different command could be processed instead that would not result in a hold, overall efficiency could be increased.

Attempts have previously been made at managing order of execution of commands, but the inventors have recognized and appreciated that prior solutions necessitated large resource consumption that led to inefficiencies in design and operation of processing units. For example, some prior solutions assigned sequence numbers to each command, checking sequence numbers before executing a command, and ensuring that no command was processed before a command with an earlier/lesser sequence number. The inventors recognized and appreciated limitations of this solution. For example, it was difficult to assign the sequence numbers reliably, as commands might arrive out of order to the module making the assignments. In addition, as processing speed, number of processing paths, and bandwidth of processing units increases, a number of commands to be processed in a time period often also increases. Ensuring reliable ordering governed by sequence numbers with this prior solution necessitated larger and larger sequence numbers, meaning more storage for sequence numbers and wider buses for exchanging and analyzing sequence numbers. This led to increasing size and complexity of systems for managing orderly processing of commands.

Described herein are techniques that can aid in reducing resources that can be needed for managing an order of processing of commands by processing units. Some techniques described herein can receive one or more commands at a processing unit and, upon receipt, one or more controllers can assign the commands to be processed by a processing path from among multiple processing paths of the processing unit. Once assigned to a processing path, each command can be put into a processing path-specific queue to await processing. In addition to storing the command in the queue for the processing path, the controller(s) can set an identifier for the command, which indicates for the command the processing path to which it was assigned. The identifiers can be placed in a queue or buffer in the same order in which the commands were received (e.g., the receipt order). As such, when the commands are separated from one another and placed into different queues for different data paths, the identifier queue or buffer can indicate an order in which the commands were received. This ordering can be subsequently used, as discussed below, to manage processing order of commands.

In some implementations, the identifier can be an identifier having the number of bits needed to express in binary a number of different values corresponding to the number of processing paths of the processing unit. For example, for a processing unit with four processing paths, the identifier can be a two-bit identifier, as two bits is needed to represent in binary four different values. As another example, for a processing unit with eight processing paths, the identifier can be a three-bit identifier, as three bits is needed to represent in binary eight different values. In some implementations, the identifiers can be stored in a queue or buffer having a bit width as wide as the number of bits of the identifier, such that in some cases the identifier queue is a two-bit buffer or queue, with a number of entries in the queue corresponding to a number of received commands not yet processed. In some implementations in which the identifier is stored as a number of bits in this manner, such a small number of bits can be less than what was needed with prior solutions to represent order (e.g., large sequence numbers), resulting in reduction of resources needed to manage processing order as compared to prior solutions.

In some implementations, the same queue can be maintained for multiple processing paths, such that entries in one queue correspond to commands that are in multiple different processing queues to be processed by multiple different processing paths. In some implementations, there can be only one such queue, while in other implementations there can be multiple queues. In an implementation in which there are multiple queues, each queue can correspond to a different set of commands that relate to a different set of data. As discussed above, in some cases techniques described herein can be used to reduce the chances of delays or holds arising. In a case in which there are multiple different sets of data being processed, different queues of identifiers for data paths can correspond to different command/data sets. This can aid in ensuring, in some such implementations, that commands for a particular set of commands/data are processed in an order for that set, while other command/data sets can be processed in the orders for those sets.

For example, in some implementations, commands can be received via different input paths and relate to different input data channels, such that there are multiple different sets (e.g., streams) of input commands and for each a corresponding set (e.g., stream) of data to be processed by the commands. In some such cases, when commands for an input data channel are assigned to different processing paths, an identifier for the command in that data channel can be entered into an identifier queue or buffer for that data channel, and when commands for a different input data channel are assigned to different processing paths (which can be the same processing paths as for the other input channel, as the processing unit can use the same processing paths for different input data channels), the identifiers can be placed into an identifier queue or buffer for that data channel.

Subsequently, when a controller for a processing path is choosing between commands in a queue for the processing path to determine whether to provide a command to the processing path for processing at a time or determining which command to select for processing at the time, the controller can leverage the set of identifiers that indicates the order. The identifier queue indicates, in the order in which commands were received, the processing paths to which different commands were assigned. The controller can determine, at a time, whether the identifier for its processing path is at the top of the identifier queue.

For example, the controller for processing path number "2" can determine whether the top entry in the identifier queue is "2." If it is, the controller determines that the next command in its queue is the next command received in the receive order and that the controller is able to pass the command for processing on the processing path. If, however, the controller determines that the top entry in the identifier queue is "1", the controller for processing path number "2" can conclude that the command for processing path "1" needs to be processed first, to reduce chances of data errors. The controller can therefore wait, checking the identifier queue periodically (e.g., each clock cycle) to determine whether the top entry in the identifier queue is "2." When the top entry is "2", the controller can pass the top command in its processing path's command queue on for processing by the processing path and remove the top entry from the identifier queue.

In a case that there are multiple command queues for each processing path, such as for multiple input data channels, this management can be done on a per-queue/per-data-channel basis. In some such cases, the controller can determine whether any of the queues have a command that is at the top of the identifier queue for its data channel and, if so, select for processing by the processing path one of the commands that is at the top of its identifier queue.

As will be described in greater detail below, the present disclosure describes various systems and methods for managing order of command processing.

In some implementations, the techniques described herein relate to a computer-implemented method for managing order of command processing, at least a portion of the computer-implemented method being performed by at least one circuit, the computer-implemented method including: in response to receiving each command of a plurality of commands in a receipt order, assigning each of the plurality of commands to a respective processing queue of a plurality of processing queues to be processed, setting, for each of the plurality of commands and in the receipt order, an identifier based on the respective processing queue assigned to each of the plurality of commands, and managing, based on the identifier of each of the plurality of commands in the receipt order, a processing order of each of the plurality of commands from the respective processing queue of the plurality of processing queues.

In some implementations, the techniques described herein relate to a computer-implemented method, further including: storing, prior to assigning each of the plurality of commands to the respective processing queue, each of the plurality of commands in a respective staging queue of a plurality of staging queues.

In some implementations, the techniques described herein relate to a computer-implemented method, further including: modifying an allocation identifier based on storing each of the plurality of commands in the respective staging queue of the plurality of staging queues.

In some implementations, the techniques described herein relate to a computer-implemented method, wherein assigning each of the plurality of commands includes: assigning, based on the respective staging queue assigned to each of the plurality of commands, each of the plurality of commands to the respective processing queue.

In some implementations, the techniques described herein relate to a computer-implemented method, wherein storing further includes: receiving, a first packet of a respective command of the plurality of commands; storing the first packet of the respective command in the respective staging queue; receiving, subsequent to receiving the first packet, a second packet of the respective command; and storing, subsequent to storing the first packet, the second packet of the respective command in the respective staging queue.

In some implementations, the techniques described herein relate to a computer-implemented method, wherein assigning each of the plurality of commands includes: generating the respective command from the first packet and the second packet; and assigning the respective command to the respective processing queue of the plurality of processing queues.

In some implementations, the techniques described herein relate to a computer-implemented method, wherein the identifier is a 2-bit identifier stored in a buffer.

In some implementations, the techniques described herein relate to a computer-implemented method, wherein managing the processing order includes: identifying a respective source of each of the plurality of commands; and managing, based on the identifier and the respective source, the processing order of each of the plurality of commands from the respective processing queue.

In some implementations, the techniques described herein relate to a computer-implemented method, further including: outputting for processing each respective command of the plurality of commands from their respective processing queue according to the processing order.

In some implementations, the techniques described herein relate to a computer-implemented method, further including: modifying the identifier after outputting each respective command of the plurality of commands from the respective processing queue.

In some implementations, the techniques described herein relate to a system for managing order of command processing, the system including: a plurality of staging queues for storing a plurality of commands received in a receipt order; a plurality of processing queues for receiving the plurality of commands from the plurality of staging queues and outputting, for processing, the plurality of commands from the plurality of processing queues, wherein each respective processing queue is associated with a respective staging queue; and a queue of identifiers, stored in the receipt order, each indicative of each of the plurality of processing queues to which a corresponding command of the plurality of commands was assigned.

In some implementations, the techniques described herein relate to a system, further including: at least one circuit arranged to: identify, based on a respective identifier of each command in the queue of identifiers, whether each command of the plurality of commands can be processed; and identify, based on the respective identifier, that the plurality of commands can be output for processing from the plurality of processing queues in a processing order.

In some implementations, the techniques described herein relate to a system, wherein the at least one circuit is further arranged to: modify an allocation identifier based on storing each respective command of the plurality of commands in the respective staging queue of the plurality of staging queues.

In some implementations, the techniques described herein relate to a system, wherein the at least one circuit is further arranged to: assign, based on the respective staging queue assigned to each of the plurality of commands, each respective command of the plurality of commands to each of the plurality of processing queues.

In some implementations, the techniques described herein relate to a system, wherein the at least one circuit is further arranged to: receive a first packet of a respective command of the plurality of commands; store the first packet of the respective command in the respective staging queue; receive, subsequent to receiving the first packet, a second packet of the respective command; and store, subsequent to storing the first packet, the second packet of the respective command in the respective staging queue.

In some implementations, the techniques described herein relate to a system, wherein the at least one circuit is further arranged to: generate the respective command from the first packet and the second packet; and assign the respective command to a respective processing queue of the plurality of processing queues.

In some implementations, the techniques described herein relate to a system, wherein the at least one circuit is further arranged to: identify a respective source of each of the plurality of commands; and manage, based on the queue of identifiers and the respective source, the processing order of each of the plurality of commands from the plurality of processing queues.

In some implementations, the techniques described herein relate to a system, wherein the at least one circuit is further arranged to: output for processing each respective command of the plurality of commands from their respective processing queue according to the processing order.

In some implementations, the techniques described herein relate to a system, wherein the at least one circuit is further arranged to: remove the respective identifier from the queue of identifiers after outputting each respective command of the plurality of commands from their respective processing queue.

In some implementations, the techniques described herein relate to a non-transitory computer-readable medium including one or more computer-executable instructions that, when executed by at least one circuit, cause the at least one circuit to manage processing order for a plurality of commands by: in response to receiving each command of the plurality of commands in a receipt order, assigning each respective command of the plurality of commands to a respective processing queue of a plurality of processing queues to be processed, setting, for each of the plurality of commands and in the receipt order, an identifier based on the respective processing queue assigned to each of the plurality of commands, and managing, based on the identifier for each of the plurality of commands in the receipt order, a processing order of each of the plurality of commands from the respective processing queue of the plurality of processing queues. Features from any of the implementations described herein can be used in combination with one another in accordance with the general principles described herein. These and other implementations, features, and advantages will be more fully understood upon reading the following detailed description in conjunction with the accompanying drawings and claims.

Below are provided, with reference to FIGS. 1-3, detailed descriptions of example systems for managing order of command processing. Detailed descriptions of examples of computer-implemented methods are also provided in connection with FIGS. 4-6. It should be appreciated that while example implementations are provided, other implementations are possible, and implementations are not limited to operating in accordance with the examples below.

Figure 1:
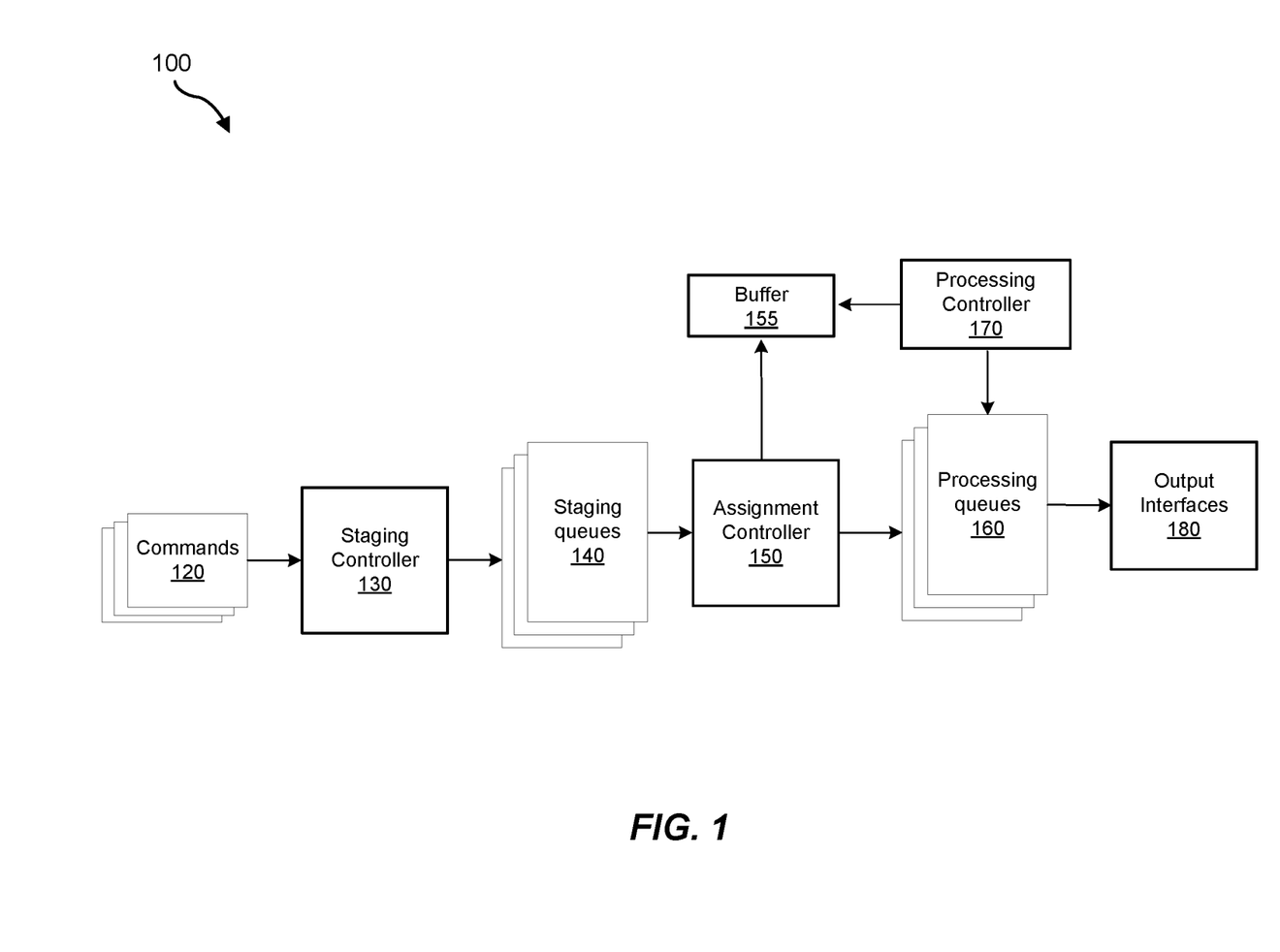
FIG. 1 is a block diagram of an example system for managing order of command processing.

FIG. 1 is a block diagram of an example system 100 for managing order of command processing. As illustrated in this figure, example system 100 can include one or more controllers (e.g., staging controller 130, assignment controller 150, and/or processing controller 170) for managing order of command processing. As will be explained in greater detail below, the system 100 can include a command, staging controller 130, staging queues 140, assignment controller 150, buffer 155, processing queues 160, processing controller 170, and/or output interfaces 180.

In some implementations, the system 100 of FIG. 1 can be included within a chip, such as an integrated circuit, system on a chip (SoC), or other chip. In some cases, the chip can be a processing unit, such as a data processing unit (DPU), central processing unit (CPU), or graphics processing unit (GPU). Example system 100 can include the one or more controllers for performing one or more tasks, such as in response to instructions to be executed by the one or more controllers.

Figure 3:
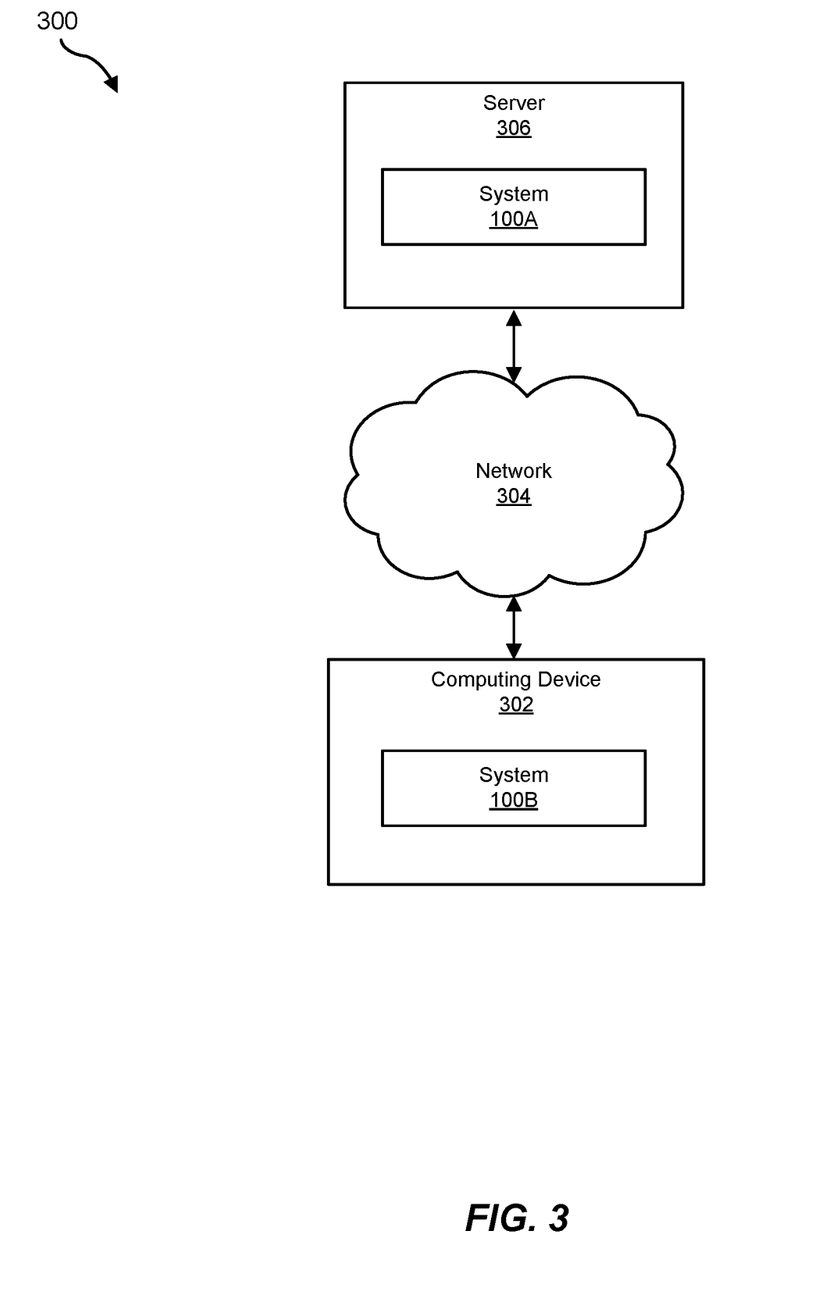
FIG. 3 is a block diagram of a computer system with which some implementations can operate.

In certain implementations, the system 100 can be a component of one or more computing devices, such as the devices illustrated in FIG. 3 (e.g., computing device 302 and/or server 306). For example, the computing device 302 can include the system 100A and/or the server 306 can include the system 100B. The system 100A and the system 100B can be similar to the system 100. The system 300 in FIG. 3 can represent all or portions of one or more special-purpose computers configured to perform one or more tasks.

While not explicitly illustrated in FIG. 1, example system 100 can also include one or more memory devices. Memory generally represents any type or form of volatile or non-volatile storage device or medium capable of storing data and/or computer-readable instructions. In one example, memory can store, load, and/or maintain the one or more controllers. Examples of memory include, without limitation, Random Access Memory (RAM), Read Only Memory (ROM), flash memory, caches, variations or combinations of one or more of the same, or any other suitable storage memory.

As illustrated in FIG. 1, the one or more controllers can be or include one or more circuits. Controllers can represent any type or form of hardware-implemented processing unit capable of interpreting and/or executing computer-readable instructions. In one example, the one or more controllers can access and/or modify one or more components (e.g., command, staging queues 140, buffer 155, processing queues 160, and/or output interfaces 180) of the system 100. In one example, the one or more controllers can access and/or modify the memory of the system 100. Additionally, or alternatively, the one or more controllers can process one or more of components of the system 100 to facilitate managing order of command processing. Examples of the one or more controllers include, without limitation, cores, logic units, microprocessors, microcontrollers, Field-Programmable Gate Arrays (FPGAs) that implement softcore processors, Application-Specific Integrated Circuits (ASICs), portions of one or more of the same, variations or combinations of one or more of the same, or any other suitable physical processor.

Command can include any number of form of commands, messages, packets, or computer-readable instructions. Examples of the command include read, writes, encryptions, checksums, transmissions, or any other instructions received from a Network on Chip (NoC), Network Interface Controller (NIC), user logic, or fabric adapter. The command can be configured to be output to the output interfaces 180, including in some cases for processing (e.g., execution) by a processing path associated with an output interface of the output interfaces 180. The command can also include contextual information to be utilized for processing the command.

In some implementations, the staging controller 130 can receive the command. The staging controller 130 can include software applications, firmware, or programs that, when executed by a circuit, integrated circuit, computing device, one or more credit controllers, CPU, GPU, or DPU, can perform one or more tasks. The staging controller 130 can store the command in the staging queues 140. The staging queues 140 could be any form of buffer, memory banks, first-in-first-out (FIFO) queues, memory Random Access Memory (RAM), cache, or any other type of memory described herein. For example, staging queues 140 can include 12 FIFOs.

In some implementations, the assignment controller 150 can facilitate the transfer of a command from the staging queues 140 to one of the processing queues 160, such as based on the processing path to which the command is assigned. The assignment controller 150 can assign the command to a processing path or transfer a command in accordance with an assignment made by another element of system 100. Implementations are not limited to operating with any particular processing paths and not limited to making the assignment of commands to processing paths in any particular manner. Assignment controller 150 can include one or more unpack functions, software applications, firmware, or programs that, when executed by a computing device, integrated circuit, CPU, GPU, or DPU, can perform one or more tasks such as convert the received commands into an array of values that can be stored on the processing queues 160.

Processing queues 160 can refer to any form of buffer, memory Random Access Memory (RAM), cache, or any other type of memory described herein. Processing queues 160 can include one or more units of memory, and as discussed above can be related to processing paths of system 100. As mentioned below, each of the processing paths can be associated with an output interface of the output interfaces 180 of the system 100, which can reflect an interface by which to output a command and/or related data for processing on a processing path. Examples of processing paths include a receive engine, a "lite" receive engine (which can have reduced functionality or components as compared to the receive engine), a transmit engine, or a lite transmit engine (which can have reduced functionality or components as compared to the transmit engine).

In some implementations, a processing queue of the processing queues 160 for a processing path can be implemented as a batch of multiple queues for that processing path. Each batch of multiple queues can include a queue that is associated with the staging queues 140. This can be the case, for example, where there are multiple channels by which commands and data are being received, and there are staging queues 140 and/or processing queues 160 for each channel. For example, each staging queues 140 can include a separate FIFO per each of the processing queues 160, and each of the processing queues 160 for a processing path can include a separate FIFO for each of the staging queues 140. In some such cases, each staging queues 140 that corresponds to an input channel can be connected with multiple processing queues, one for each processing path.

The assignment controller 150 can maintain a buffer 155 to track the assignments of the command to the processing queues 160. Buffer 155 can generally refer to any form of buffer, register, counter, or any other type of memory described herein. For example, the buffer 155 can be a 2-bit wide buffer with a number of entries. In another example, the buffer 155 can use the 2-bits to indicate numbers between 0 and 3. In accordance with examples described herein, buffer 155 can include a queue of identifiers for processing paths.

In some implementations, processing controller 170 can control processing of the command from the processing queues 160 based on the buffer 155. Processing controller 170 can include software applications, firmware, or programs that, when executed by a computing device, one or more data order controllers, integrated circuit, CPU, GPU, or DPU, can perform one or more tasks. Processing controller 170 can, in accordance with techniques described herein, assign the commands 120 from the staging queues 140 to the one or more of the processing queues 160. The assignment can be done to assign each of the commands 120 for processing on different output interfaces of the output interfaces 180.

Output interfaces 180 can refer to any form of interface or output to which the command can be provided for processing. As discussed above, such processing can include executing the command, in a case that the command includes instructions or indicate instructions.

Figure 2:
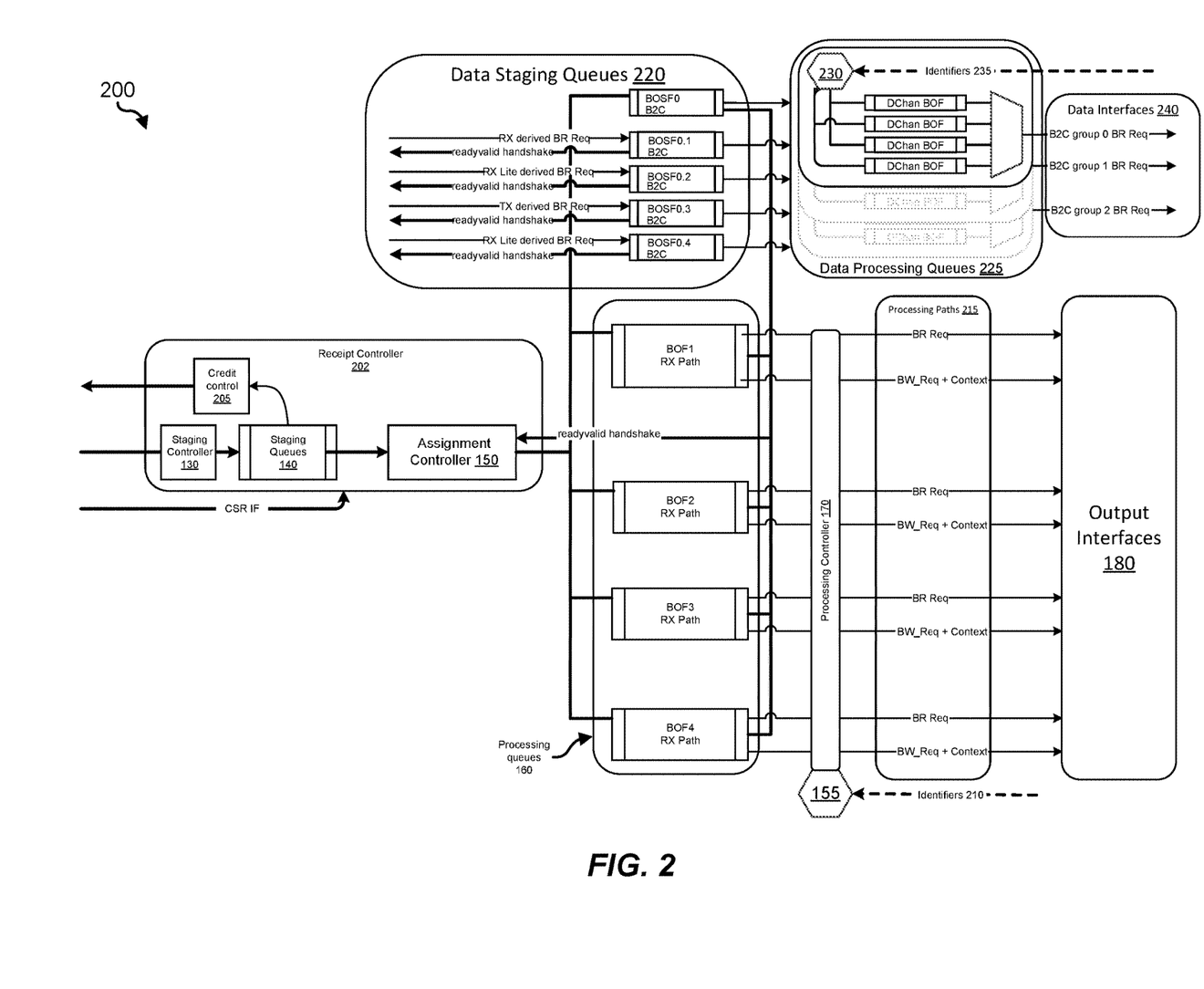
FIG. 2 is a detailed block diagram of another example system for managing order of command processing.

FIG. 2 illustrates another example system 200 with which some implementations can operate and is shown in more detail than FIG. 1. Similar elements are labeled with corresponding numbers and labels from FIG. 1. Some functionality of elements shown in FIG. 2 is also described below in connection with FIGS. 4-6.

FIG. 2 illustrates that the receipt controller 202 for managing the receipt and distribution of the command. The staging controller 130 can receive the command from external data sources described herein. For example, as illustrated in FIG. 2, the command can be control signals. In some implementations, the staging controller 130 receive 12 control signals, but any number of signals can be received. The staging controller 130 can include a reordering block for facilitating the receipt and conversion of the command from various data formats into a format for storage in the staging queues 140. For example, the staging queues 140 can be a 128×256 memory buffer. FIG. 2 illustrates that the staging controller 130 can receive, via an interface (I/F), control and status registers (CSR), which can include instructions relating to the command.

The receipt controller 202 can include a credit controller 205 that can set the allocation identifier to indicate the storage allocations for the command. The credit controller 205 can monitor the memory utilization in the staging queues 140 to set the allocation identifier. The bit width of the allocation identifier can be set based on the number of queues in the processing queues 160 where the command can be received in the staging queues 140. For example, the credit controller 205 can set the allocation identifier as a 12-bit identifier for 12 queues. In another example, the staging controller 130 can receive twelve of the commands. The staging controller 130 can set the allocation identifier to indicate memory utilization in the staging queues 140 for the data sources. The credit controller 205 can transmit the allocation identifier to the data sources to indicate whether additional commands can be received.

The receipt controller 202 can include the assignment controller 150 to place the commands 120 from the staging queues 140 to the processing queues 160. For example, the assignment controller 150 can output twelve control signals to place the commands 120 from the staging queues 140 to twelve queues of the processing queues 160. The assignment controller 150 can convert the commands 120 into an array of values that can be stored on the processing queues 160. For example, as illustrated in FIG. 2, the assignment controller 150 can distribute the commands 120 across 12 queues of the processing queues 160.

FIG. 2 illustrates that processing queues 160 can be implemented as a plurality of queues (e.g., FIFOs) or engines. For example, BOF1 can correspond to the receive engine and be 1209×64 bits, BOF2 can correspond to a "lite" receive engine (which can have reduced functionality or components as compared to the receive engine) and be 600×64 bits, BOF3 can correspond to a transmit engine and be 1515×64 bits, and BOF4 can correspond to a lite transmit engine (which can have reduced functionality or components as compared to the transmit engine) and can be 600×64 bits. The buffer 155 can store identifiers 210 indicative of how the commands 120 are assigned. Examples of the identifiers 210 include vFIFO data credits.

FIG. 2 illustrates that that the processing controller 170 can control the processing of the commands 120 from each of the processing queues 160. The processing controller 170 can control the processing of the commands 120 from each of the processing paths 215 based on the buffer 155 and the buffer 155. For example, the buffer 155 can indicate the data out channel credits to determine whether the commands 120 can be sent for processing in order. The output interfaces 180 that can process the commands 120. As one example, the output interfaces 180 can receive read and/or write instructions included in the commands 120 for execution. In some cases, the different processing paths of the output interfaces 180 can be able to perform different processing in response to input commands, such as being able to process some of the commands 120 and not others or being able to process some of the commands 120 more efficiently than others.

FIG. 2 illustrates that processing queues 160 can correspond to processing paths 215 corresponding to the output interfaces 180. In some implementations, the commands 120 can be processed from the processing queues 160 via processing paths 215 to the output interfaces 180. As discussed above, one or more of the processing paths 215 can be arranged differently, can include different components, or can be adapted to perform different functions. Each of the processing paths 215 can also lead to different destinations in the system 100, such as to different components of the system 100 or different interfaces to different elements outside of system 100. For example, the output interfaces 180 can include destination paths such as a buffer subsystem buffer, a data out channel, conduit channel, a network interface card transmit path, or a combination of the foregoing.

Each of the processing queues 160 can correspond to one or more of the data staging queues 220 that corresponds to one or more data of the data processing queues 225 for transmitting data associated with the commands 120. For example, the data staging queues 220 can include BOSF0, BOSF0.1, BOSF0.2, BOSF0.3, and BOSF0.4 to process the data associated with the commands 120. The data staging queues 220 can handle any bus communications, such as 117×8 bits. Each of the data staging queues 220 can hold the data.

The data staging queues 220 can be communicatively coupled to the processing queues 160 to identify when the commands 120 are processed. Processing of the commands 120 from the processing queues 160 can cause the processing queues 160 to output one or more signals to the data staging queues 220 to indicate the processing. The data staging queues 220 can process the data associated with the commands 120 in response to receiving the signals.

The data can be transmitted to the data processing queues 225. For example, the data processing queues 225 can include data channel buffers (e.g., DChan BOF). In some implementations, the data staging queues 220 can push the data into the data processing queues 225. A data controller 230 (e.g., group arbitration block) can identify whether to process the data from the data processing queues 225. The data controller 230 can identify whether to process the data based on identifiers 235 (e.g., data out channel credits) that indicate utilization and availability on the data interfaces 240 (e.g., data channels) through which the data is transmitted from the data processing queues 225.

Example system 100 in FIG. 1 and system 200 in FIG. 2 can be implemented in a variety of ways. For example, all or a portion of system 100 and/or system 200 can represent portions of system 300 in FIG. 3. As shown in FIG. 3, system 300 can include a computing device 302 in communication with a server 306 via a network 304. In one example, all or a portion of the functionality of system 100 can be performed by the computing device 302, server 306, and/or any other suitable computing system. As will be described in greater detail below, one or more components from FIG. 1 can, when executed by at least one processor of computing device 302 and/or server 306, enable computing device 302 and/or server 306 to manage order of command processing.

Computing device 302 generally represents any type or form of computing device capable of reading computer-executable instructions. For example, the computing device 302 can be an integrated circuit or a network interface controller (NIC). Additional examples of computing device 302 include, without limitation, laptops, tablets, desktops, servers, cellular phones, Personal Digital Assistants (PDAs), multimedia players, embedded systems, wearable devices (e.g., smart watches, smart glasses, etc.), smart vehicles, so-called Internet-of-Things devices (e.g., smart appliances, etc.), gaming consoles, variations or combinations of one or more of the same, or any other suitable computing device.

Server 306 generally represents any type or form of computing device that is capable of reading computer-executable instructions. For example, the server 306 can include circuits or network interfaces. Additional examples of server 306 include, without limitation, storage servers, database servers, application servers, and/or web servers configured to run certain software applications and/or provide various storage, database, and/or web services. Although illustrated as a single entity in FIG. 3, server 306 can include and/or represent a plurality of servers that work and/or operate in conjunction with one another.

Network 304 generally represents any medium or architecture capable of facilitating communication or data transfer. In one example, network 304 can facilitate communication between computing device 302 and server 306. In this example, network 304 can facilitate communication or data transfer using wireless and/or wired connections. Examples of network 304 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Many other devices or subsystems can be connected to system 100 in FIG. 1, system 200 in FIG. 2, and/or system 300 in FIG. 3. Conversely, all of the components and devices illustrated in FIGS. 1-3 need not be present to practice the implementations described and/or illustrated herein. The devices and subsystems referenced above can also be interconnected in different ways from that shown in FIG. 1-3. System 100, system 200, and system 300 can also employ any number of software, firmware, and/or hardware configurations. For example, one or more of the example implementations disclosed herein can be encoded as a computer program (also referred to as computer software, software applications, computer-readable instructions, and/or computer control logic) on a computer-readable medium.

The term "computer-readable medium," as used herein, generally refers to any form of device, carrier, non-transitory medium, non-transitory computer-readable, or medium capable of storing or carrying computer-readable instructions. Examples of computer-readable media or non-transitory computer-readable include, without limitation, transmission-type media, such as carrier waves, and non-transitory type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other non-transitory or distribution systems.

Figure 4:
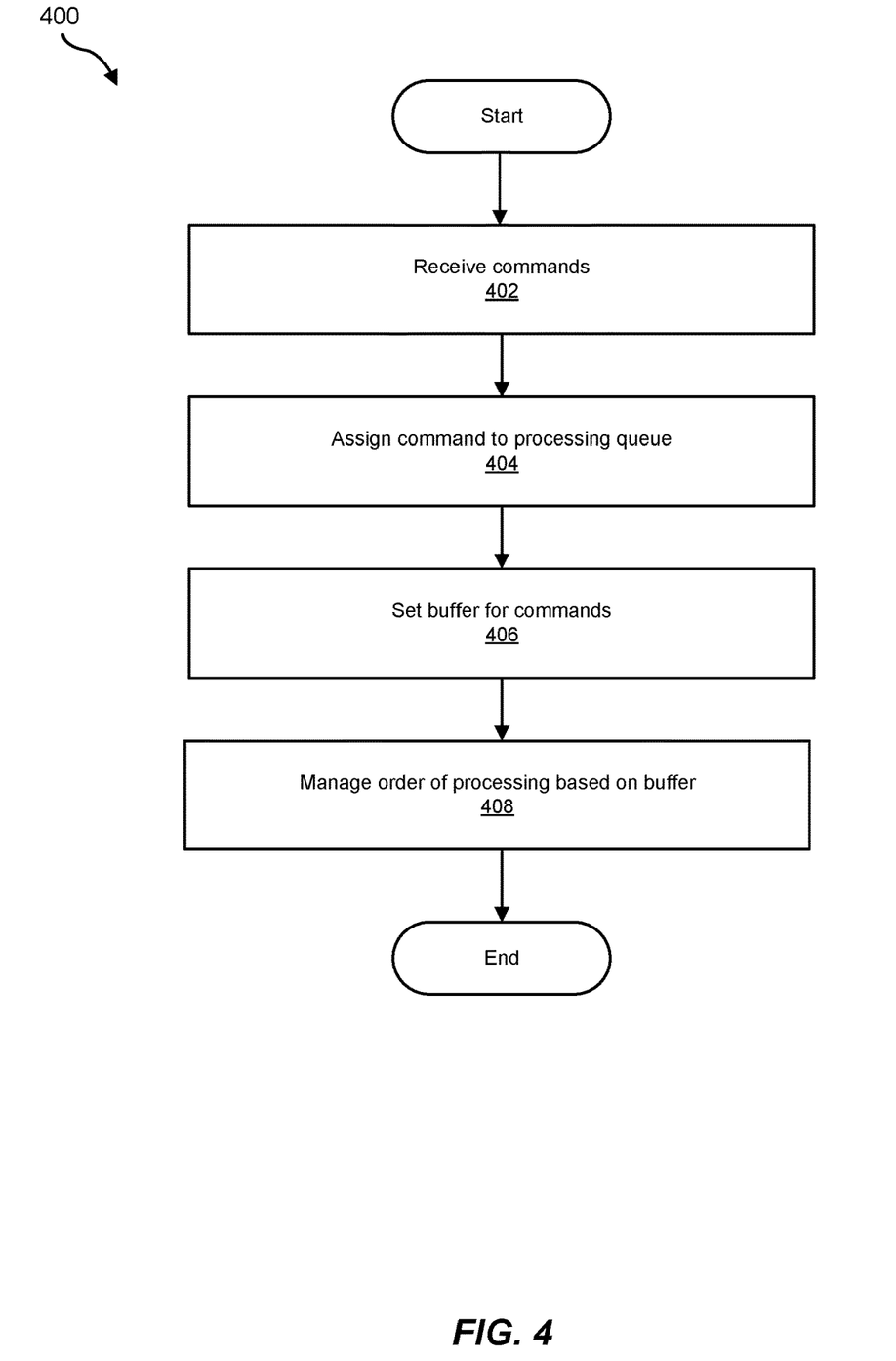
FIG. 4 is a flow diagram of an example method for managing receipt of commands.

FIG. 4 is a flow diagram of an example computer-implemented method 400 for managing order of command processing. The steps shown in FIG. 4 can be performed by any suitable computer-executable code and/or computing system, including system 100 in FIG. 1, system 200 in FIG. 2, system 300 in FIG. 3, and/or variations or combinations of one or more of the same. In one example, each of the steps shown in FIG. 4 can represent an algorithm whose structure includes and/or is represented by multiple sub-steps, examples of which will be provided in greater detail below.

As illustrated in FIG. 4, at step 402, one or more of the systems described herein can receive commands 120. For example, as part of step 402, the assignment controller 150 can, as part of system 100 in FIG. 1, receive commands 120, such as from the staging queues 140 or another source. The systems described herein can perform step 402 in a variety of ways. In one example, the assignment controller 150 can manage the processing queues 160 receiving multiple commands from the staging queues 140. In some implementations, the staging controller 130 store the commands 120 in the staging queues 140. For example, the staging queues 140 can include a storage buffer where the commands 120 are stored. In some implementations, the staging controller 130 can store the commands 120 in the order that they are received. For example, the staging controller 130 can store the commands 120 in a receipt order. In some implementations, the staging controller 130 can store each of the commands 120 in the staging queues prior to the assignment of each respective command to the processing queues 160.

In some implementations, the staging controller 130 can manage the storage allocations of the staging queues 140. For example, the staging controller 130 can identify an amount of storage available in the staging queues 140 to store each of the commands 120. In some implementations, the staging controller 130 can set a credit register, as illustrated in FIG. 2, such as an allocation identifier to indicate the storage allocations for the commands 120. For example, the allocation identifier can be a register or a counter that indicates an amount of storage allocated and/or available for the commands 120 in the staging queues 140. In some implementations, the staging controller 130 can modify the allocation identifier as each command is stored in the staging queues 140. For example, if the identifier is a counter, then the staging controller 130 can increase the counter when the commands 120 are stored and decrease the counter when the commands 120 are pushed from the staging queues 140 to the processing queues 160. In some implementations, the staging controller 130 can transmit the allocation identifier to the source (e.g., NoC) of the commands 120 to indicate the amount of space available in the staging queues 140 for storing the commands 120.

As illustrated in FIG. 4, at step 404, one or more of the systems described herein can assign commands 120 to the processing queues 160. For example, the assignment controller 150 can, as part of system 100 in FIG. 1, assign each command to a processing queue of the processing queues 160. The systems described herein can perform step 504 in a variety of ways. In one example, the assignment controller 150 can manage the processing queues 160 receiving the commands 120 from the staging queues 140. In some implementations, in response to receiving each command in the receipt order at the staging queues 140, the assignment controller 150 can assign each respective command to a respective processing queue to be processed.

As illustrated in FIG. 4, at step 406, one or more of the systems described herein can set the buffer 155 based on the commands 120. For example, the assignment controller 150 can, as part of system 100 in FIG. 1, set the identifiers of the buffer 155 based on the processing queues 160 to which each command is assigned. The systems described herein can perform step 406 in a variety of ways. In some implementations, the assignment controller 150 can set the identifiers of the buffer 155 based on the processing queues 160 to which the commands 120 were assigned. For example, if there are four processing paths to which commands can be assigned and four corresponding processing queues, the assignment controller 150 can set a value in a 2-bit buffer to indicate to which one of 4 channels of the processing queues 160 the command has been assigned. For example, a value of 01 in the 2-bit identifier can indicate that the command has been assigned to the #1 channel of channels #0-#3.

In some implementations, the assignment controller 150 can set the identifiers of the buffer 155 based on the output interfaces 180 to which the commands 120 were assigned, which can in some cases correspond to the processing queue to which a command was assigned. For example, the assignments (e.g., destination path, buffer, data channel, conduit channel, and/or network interface card transmission) of the commands 120 to the output interfaces 180 can be 2-bits of information. By configuring the buffer 155 for each command, the assignment controller 150 can enable the processing controller 170 to output the commands 120 from the processing queues 160 in an order that can reduce risk of errors arising, such as in an order matching a receive order.

As illustrated in FIG. 4, at step 408, one or more of the systems described herein can manage an order of processing of each of the commands 120 from the processing queues 160 based on the buffer 155. For example, the processing controller 170 can, as part of system 100 in FIG. 1, use the identifiers of the buffer 155 to identify whether the commands 120 can be processed (e.g., executed or output) from the processing queues 160 in which they are maintained. The systems described herein can perform step 408 in a variety of ways. In one example, the processing controller 170 can access the buffer 155 to determine whether the command can be processed.

In some implementations, the processing controller 170 can identify, based on the buffer 155 of each command, whether each command of the plurality of commands can be processed. For example, the processing controller 170 can use and/or cause the buffer 155 to determine whether the command is being processed in order. In some implementations, the processing controller 170 can identify, based on the buffer 155, that the command can be output for processing from the processing queues 160. For example, the processing controller 170 can cause the commands 120 to be output to the output interfaces 180, including for processing (e.g., execution). Additional details on an implementation of step 408 is described below in connection with FIG. 5.

Figure 5:
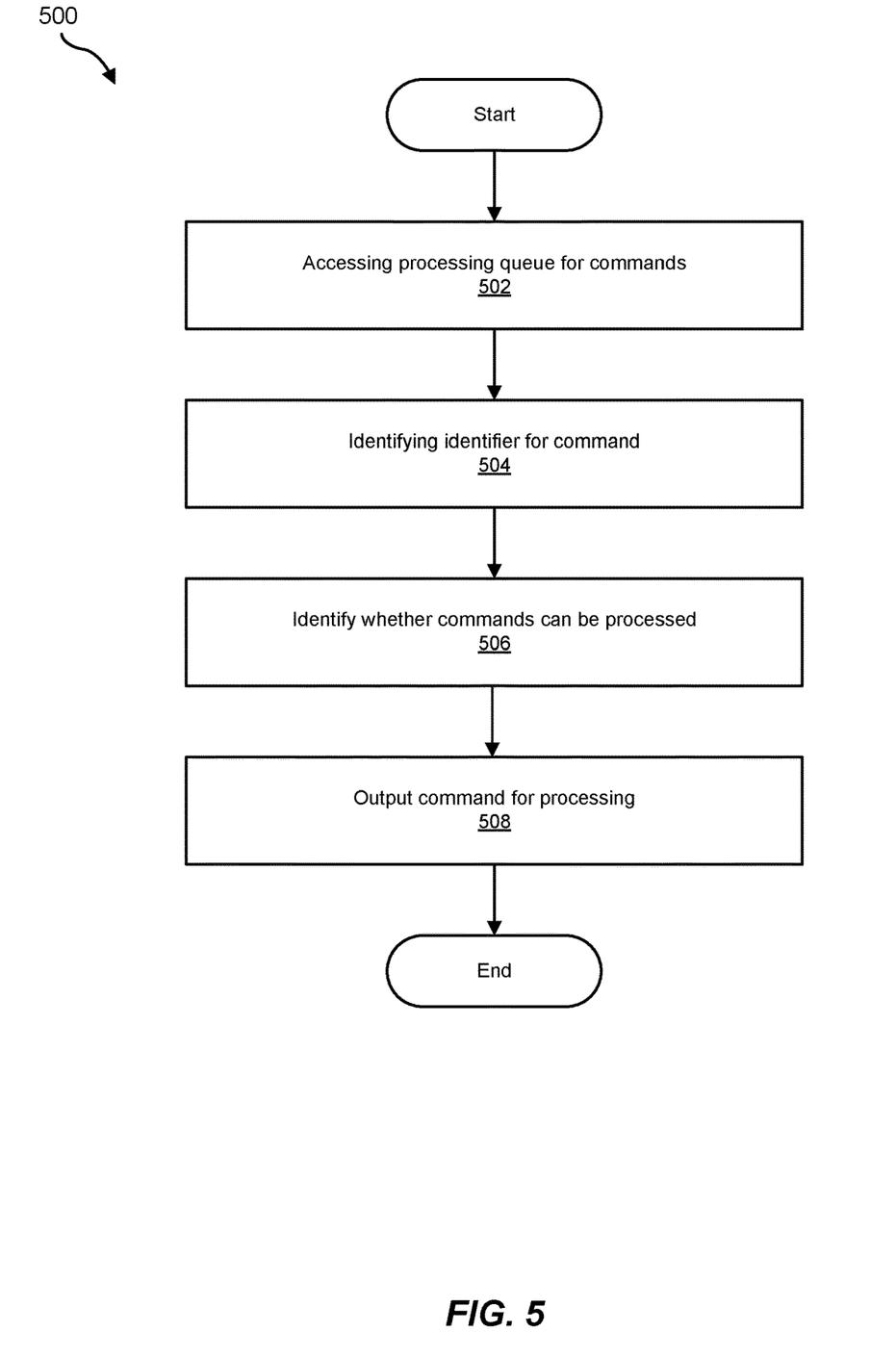
FIG. 5 is a flow diagram of an example method for managing order of command processing.

FIG. 5 is a flow diagram of an example computer-implemented method 500 for managing order of command processing. The steps shown in FIG. 5 can be performed by any suitable computer-executable code and/or computing system, including system 100 in FIG. 1, system 200 in FIG. 2, system 300 in FIG. 3, and/or variations or combinations of one or more of the same. In one example, each of the steps shown in FIG. 6 can represent an algorithm whose structure includes and/or is represented by multiple sub-steps, examples of which will be provided in greater detail below.

As illustrated in FIG. 5, at step 502, one or more of the systems described herein can access the processing queues 160 for the commands 120. For example, the processing controller 170 can, as part of system 100 in FIG. 1, access the processing queues 160 to identify the commands 120 stored therein. The systems described herein can perform step 602 in a variety of ways. In one example, the processing controller 170 can identify the commands 120 that await processing. The processing controller 170 can identify sets of commands in each of the processing queues 160. For example, each of the processing queues 160 can represent a path-specific queue into which the commands 120 were placed after being assigned to a corresponding processing path.

In some implementations, the processing controller 170 can manage the order of processing of the commands 120 from the processing queues 160 based on the source of the commands 120. The source of the commands 120 can determine whether the commands 120 are available to be processed. For example, the processing controller 170 can identify the source of the commands 120 as a buffer from which the commands 120 are available for processing. In some implementations, if the processing controller 170 identifies that the source of the commands 120 is a data channel, the processing controller 170 can manage the order of processing of the commands 120 from the processing queues 160 based on the identifier. For example, if the source of the command is a data channel, then the processing controller 170 can use the identifier to identify whether the data associated with the command is available.

As illustrated in FIG. 5, at step 504, one or more of the systems described herein can identify identifiers of the buffer 155 of the processing queues 160 for the commands 120. For example, the processing controller 170 can, as part of system 100 in FIG. 1, identify identifiers of the buffer 155 of the processing queues 160 for the commands 120. The systems described herein can perform step 504 in a variety of ways. In one example, the processing controller 170 can access the buffer 155. In some implementations, the processing controller 170 can identify the identifiers in the buffer 155 for each of the processing queues 160 for each of the commands 120.

As illustrated in FIG. 5, at step 506, one or more of the systems described herein can identify whether the commands 120 can be processed or executed. For example, the processing controller 170 can, as part of system 100 in FIG. 1, identify whether the commands 120 can be processed. By identifying whether the commands 120 can be processed before outputting the commands 120, the processing controller 170 can verify that the commands 120 will be processed in a timely manner (e.g., by the DPU) without delays or bottleneck issues.

The systems described herein can perform step 506 in a variety of ways. In one example, the processing controller 170 can identify, based on the buffer 155 of each command, whether each command can be processed and/or implemented. For example, the processing controller 170 can use the buffer 155 to determine whether the commands 120 that await processing can in fact be processed. The processing controller 170 can access the buffer 155 to identify the processing queues 160 associated with the command. For example, the processing controller 170 can use the buffer 155 to determine the processing path to which each command was assigned. Based on the processing queues 160 identified by the buffer 155, the processing controller 170 can determine whether the command is being processed in order. For example, since the buffer 155 is set in the same order as the order in which the commands 120 are received, the buffer 155 would correspond to commands 120 that are in fact being processed in order. In some implementations, the processing controller 170 can identify, based on the buffer 155, that the command can be output for processing from the processing queues 160.

For example, the buffer 155 can indicate one of four different values in binary. The processing controller 170 for processing path number "2" can determine whether the top entry in the buffer 155 is "2." If it is, the processing controller 170 determines that the next command in its queue is the next command received and that it is able to pass the command for processing on the processing path. If, however, the processing controller 170 determines that the top entry in the buffer 155 is "1", the processing controller 170 for processing queues 160 number "2" can conclude that the command for processing queue number "1" needs to be processed first, to reduce chances of data errors. The processing controller 170 can therefore wait, checking the buffer 155 periodically (e.g., each clock cycle) to determine whether the top entry in the buffer 155 is "2." When the top entry is "2", the processing controller 170 can pass the top command in its respective processing queue on for processing and remove the top entry from the buffer 155. For example, the processing controller 170 can remove and/or modify the entry and/or bit corresponding to the processing queue from which the command was processed.

As illustrated in FIG. 5, at step 508, one or more of the systems described herein can output the commands 120 to the output interfaces 180. For example, the processing controller 170 can, as part of system 100 in FIG. 1, output the commands 120 to the output interfaces 180. The systems described herein can perform step 508 in a variety of ways. In one example, the processing controller 170 can output the commands 120 for processing to the output interfaces 180. In some implementations, the processing controller 170 can cause the commands 120 to be output to the output interfaces 180, including for processing (e.g., execution). By outputting the commands 120 based on the buffer 155, the processing controller 170 can output the commands 120 from the processing queues 160 according to the order of processing intended by the sender of the commands 120.

After outputting the commands 120, the processing controller 170 can modify the identifiers in the buffer 155 to update the availability of the processing queues 160. In some implementations, the processing controller 170 can remove an identifier and/or entry and/or reset the buffer 155 after outputting the commands 120 from the processing queues 160. For example, the processing controller 170 can modify the identifier buffer, such as by removing the identifier for the command that has been output (e.g., pop the identifier based on the processing queues 160 and/or output interfaces 180 that have been made available after processing the command) to indicate the availability of the processing queues 160 for processing of additional commands. By working with the buffer 155, the system 100 can allow for a fast and efficient use of computer resources to manage the commands 120.

In some implementations, a command can take up a lot of data (e.g., 1500 bits) that would have to be stored in a large bus (e.g., wide and shallow memory). The problem is that this type of storage uses up a lot of area and power, which is not optimal for compact and efficient processing. A solution to this problem can include splitting up the command into multiple pieces that can each be received during a separate clock cycle. The command can be split up without affecting the processing of the command because only a piece of the command might be essential for immediate processing while other pieces can include contextual information such as metadata indicative of the command's source. Since each piece would be smaller than the entire command, each piece could be stored in a more efficient manner.

Figure 6:
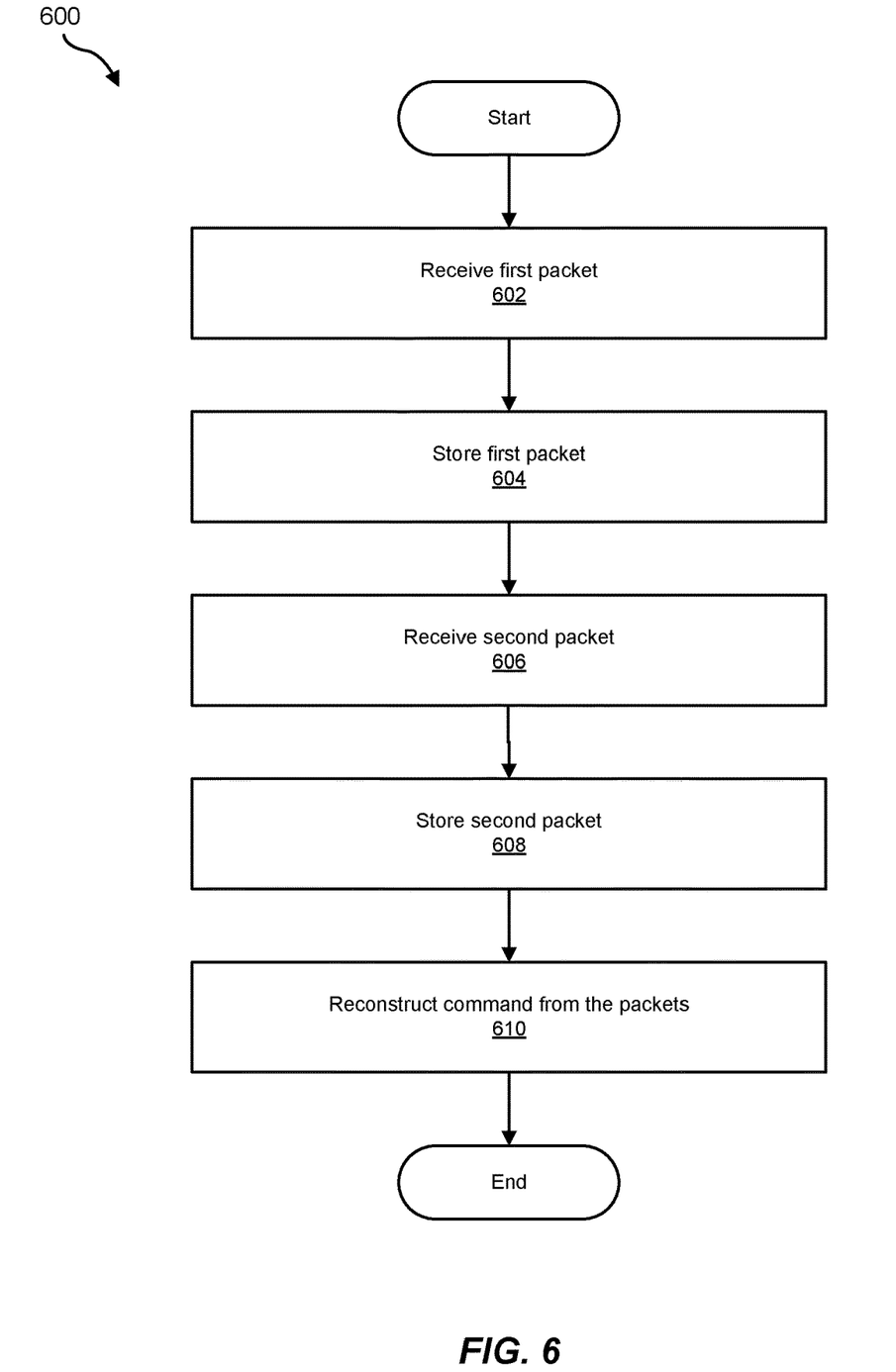
FIG. 6 is a flow diagram of an example method for processing commands according to an order.

FIG. 6 is a flow diagram of an example computer-implemented method 600 for optimizing the receipt of commands for managing order of command processing. The steps shown in FIG. 6 can be performed by any suitable computer-executable code and/or computing system, including system 100 in FIG. 1, system 200 in FIG. 2, system 300 in FIG. 3, and/or variations or combinations of one or more of the same. In one example, each of the steps shown in FIG. 6 can represent an algorithm whose structure includes and/or is represented by multiple sub-steps, examples of which will be provided in greater detail below.

As illustrated in FIG. 6, at step 602, one or more of the systems described herein can receive a first packet of the command. For example, the staging controller 130 can, as part of system 100 in FIG. 1, receive the first packet of the command. The systems described herein can perform step 602 in a variety of ways. In one example, the staging controller 130 can receive the command as multiple packets. A command can include 1500 bits of related context such as metadata indicative of the command's source, which while useful, might not be essential to read during the first clock cycle upon receiving the command. Storing the entire command as one packet can be power and area intensive by requiring a very wide but shallow memory. For example, storing the command as one packet can involve utilizing many instances of smaller memories in parallel. However, the command can arrive over multiple clock cycles. For example, the command can be distributed across two packets, each including 750-bytes. One packet can include the command portion of the command while the other packet can include the contextual portion of the command.

As illustrated in FIG. 6, at step 604, one or more of the systems described herein can store the first packet of the command. For example, the staging controller 130 can, as part of system 100 in FIG. 1, store the first packet of the command. The systems described herein can perform step 604 in a variety of ways. In one example, instead of waiting for all the packets to arrive, the staging controller 130 can store the packets as they arrive. The staging controller 130 can store the first packet of the command in the staging queues 140. For example, the first packet can include enough information for processing the command while the subsequent packets can include contextual information. By storing the first packet without waiting for the subsequent packets, the staging controller 130 can reduce (e.g., halve) the required data width that needs to be allocated in the staging queues 140 whilst increasing (e.g., doubling) the depth. This arrangement can result in a more area and power efficient structure that reduces (e.g., halves) the number of memory instances required in the staging queues 140 to store the command.

In some implementations, the staging controller 130 can identify, in fields of the first packet, whether the command includes additional packets with additional information (e.g., command information or contextual information). In some implementations, the staging controller 130 can identify that the command is fully contained in one packet. For example, the staging controller 130 can identify that the command does not include any additional packets with related contextual information. To maximize throughput of the commands (e.g., command rate), the staging controller 130 can store the entire command after storing the first and only packet during the first clock cycle. For example, the command can be a single cycle command. In this implementation, the computer-implemented method 600 can proceed to step 610. In some implementations, the staging controller 130 can identify, in fields of the first or subsequent packets, that the command includes additional packets with additional information (e.g., command information or contextual information). If the staging controller 130 expects to receive additional packets for the command, then the computer-implemented method 600 can proceed to step 606.

As illustrated in FIG. 6, at step 606, one or more of the systems described herein can receive a second packet of the command. For example, the staging controller 130 can, as part of system 100 in FIG. 1, receive a second packet of the command. The systems described herein can perform step 406 in a variety of ways. In one example, the staging controller 130 can receive, subsequent to receiving the first packet, a second packet of the command. The staging controller 130 can store the second packet after receiving the first packet.

As illustrated in FIG. 6, at step 608, one or more of the systems described herein can store the second packet of the command. For example, the staging controller 130 can, as part of system 100 in FIG. 1, store the second packet of the command. The systems described herein can perform step 408 in a variety of ways. In one example, the staging controller 130 can store, subsequent to storing the first packet, the second packet of the command in the staging queues 140.

As illustrated in FIG. 6, at step 610, one or more of the systems described herein can generate (e.g., reconstruct) the command from the one or more packets. For example, the staging controller 130 can, as part of system 100 in FIG. 1, generate the command from the first packet (e.g., command portion) and the second packet (e.g., contextual portion). The systems described herein can perform step 610 in a variety of ways. In one example, the staging controller 130 can generate the command after all its packets have been received by the staging controller 130. In one example, the staging controller 130 can generate the command after all its packets have been received by the staging controller 130 and stored in the staging queues 140. For example, staging controller 130 can generate the command based on the packets to include the command portion and the contextual portion. After generating the command from the packets, the assignment controller 150 can assign the command to the processing queues 160.

While the foregoing disclosure sets forth various implementations using specific block diagrams, flowcharts, and examples, each block diagram component, flowchart step, operation, and/or component described and/or illustrated herein can be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of system 100 in FIG. 1 can represent portions of a cloud-computing or network-based environment. Cloud-computing environments can provide various services and applications via the Internet. These cloud-based services (e.g., software as a service, platform as a service, infrastructure as a service, etc.) can be accessible through a web browser or other remote interface. Various functions described herein can be provided through a remote desktop environment or any other cloud-based computing environment.

In various implementations, all or a portion of system 100 in FIG. 1 can facilitate multi-tenancy within a cloud-based computing environment. In other words, the modules described herein can configure a computing system (e.g., a server) to facilitate multi-tenancy for one or more of the functions described herein. For example, one or more of the modules described herein can program a server to enable two or more clients (e.g., customers) to share an application that is running on the server. A server programmed in this manner can share an application, operating system, processing system, and/or storage system among multiple customers (i.e., tenants). One or more of the modules described herein can also partition data and/or configuration information of a multi-tenant application for each customer such that one customer cannot access data and/or configuration information of another customer.

According to various implementations, all or a portion of system 100 in FIG. 1 can be implemented within a virtual environment. For example, the modules and/or data described herein can reside and/or execute within a virtual machine. As used herein, the term "virtual machine" generally refers to any operating system environment that is abstracted from computing hardware by a virtual machine manager (e.g., a hypervisor).

In some examples, all or a portion of system 100 in FIG. 1 can represent portions of a mobile computing environment. Mobile computing environments can be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments can have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein can be provided for a mobile computing environment and/or can interact with a mobile computing environment.

The process parameters and sequence of steps described and/or illustrated herein are given by way of example only and can be varied as desired. For example, while the steps illustrated and/or described herein can be shown or discussed in a particular order, these steps do not necessarily need to be performed in the order illustrated or discussed. The various example methods described and/or illustrated herein can also omit one or more of the steps described or illustrated herein or include additional steps in addition to those disclosed.

While various implementations have been described and/or illustrated herein in the context of fully functional computing systems, one or more of these example implementations can be distributed as a program product in a variety of forms, regardless of the particular type of computer-readable media used to actually carry out the distribution. The implementations disclosed herein can also be implemented using modules that perform certain tasks. These modules can include script, batch, or other executable files that can be stored on a computer-readable storage medium or in a computing system. In some implementations, these modules can configure a computing system to perform one or more of the example implementations disclosed herein.

The preceding description has been provided to enable others skilled in the art to best utilize various implementations of the examples disclosed herein. This example description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for managing order of command processing, at least a portion of the computer-implemented method being performed by at least one circuit, the computer-implemented method comprising:
   in response to receiving a command of a plurality of commands in a receipt order:
      assigning the command to one processing queue of a plurality of processing queues to be processed; and
      setting, for the command of the plurality of commands and in the receipt order, an identifier based on which processing queue of the plurality of processing queues to which the command of the plurality of commands is assigned; and
   managing, based on the identifier of each of the plurality of commands in the receipt order, a processing order for each of the plurality of commands from the plurality of processing queues.

2. The computer-implemented method of claim 1, further comprising:
   storing, prior to assigning each of the plurality of commands to one of the plurality of processing queues, each of the plurality of commands in a staging queue of a plurality of staging queues.

3. The computer-implemented method of claim 2, further comprising:
   modifying an allocation identifier based on storing each of the plurality of commands in one of the plurality of staging queues.

4. The computer-implemented method of claim 2, wherein assigning each of the plurality of commands comprises:
   assigning, based on the staging queue to which each of the plurality of commands is assigned, each of the plurality of commands to one of the plurality of processing queues.

5. The computer-implemented method of claim 2, wherein storing further comprises:
   receiving a first packet of a command of the plurality of commands;
   storing the first packet of the command in one of the plurality of staging queues;
   receiving, subsequent to receiving the first packet, a second packet of the command; and
   storing, subsequent to storing the first packet, the second packet of the command in one of the plurality of staging queues.

6. The computer-implemented method of claim 5, wherein assigning each of the plurality of commands comprises:
   generating the command from the first packet and the second packet; and assigning the command to one of the plurality of processing queues.

7. The computer-implemented method of claim 1, wherein the identifier is a 2-bit identifier stored in a buffer.

8. The computer-implemented method of claim 1, wherein managing the processing order comprises:
   identifying a source of each of the plurality of commands; and
   managing, based on the identifier and the source, the processing order of each of the plurality of commands from the plurality of processing queues.

9. The computer-implemented method of claim 1, further comprising:
outputting for processing each command of the plurality of commands from the plurality of processing queues according to the processing order.

10. The computer-implemented method of claim 9, further comprising:
modifying the identifier after outputting each command of the plurality of commands from the plurality of processing queues.

11. A non-transitory computer-readable medium comprising one or more computer-executable instructions that, when executed by at least one circuit, cause the at least one circuit to manage processing order for a plurality of commands by:
in response to receiving a command of the plurality of commands in a receipt order;
assigning the command to one processing queue of a plurality of processing queues to be processed; and
setting, for the command of the plurality of commands and in the receipt order, an identifier based on which processing queue of the plurality of processing queues to which the command of the plurality of commands is assigned; and
managing, based on the identifier for each of the plurality of commands in the receipt order, a processing order for each of the plurality of commands from the plurality of processing queues.

12. A system comprising:
at least one processor; and
at least one memory including instructions that, when executed by the at least one processor, cause the at least one processor to carry out a method comprising:
in response to receiving a command of a plurality of commands in a receipt order;
assigning the command to one processing queue of a plurality of processing queues to be processed; and
setting, for the command of the plurality of commands and in the receipt order, an identifier based on which processing queue of the plurality of processing queues to which the command of the plurality of commands is assigned; and
managing, based on the identifier for each of the plurality of commands in the receipt order, a processing order for each of the plurality of commands from the plurality of processing queues.

13. The system of claim 12, further comprising:
storing, prior to assigning each of the plurality of commands to one of the plurality of processing queues, each of the plurality of commands in a staging queue of a plurality of staging queues.

14. The system of claim 13, wherein the method further comprises:
modify an allocation identifier based on storing each of the plurality of commands in one of the plurality of staging queues.

15. The system of claim 13, wherein the method further comprises:
assign, based on the staging queue to which each of the plurality of commands is assigned, each of the plurality of commands to one of the plurality of processing queues.

16. The system of claim 13, wherein the method further comprises:
receive a first packet of a command of the plurality of commands;
store the first packet of the command in one of the plurality of staging queues;
receive, subsequent to receiving the first packet, a second packet of the command; and
store subsequent to storing the first packet, the second packet of the command in one of the plurality of staging queues.

17. The system of claim 16, wherein the method further comprises:
generate the command from the first packet and the second packet; and
assign the command to one of the plurality of processing queues.

18. The system of claim 13, wherein the method further comprises:
identify a source of each of the plurality of commands; and
manage, based on the identifier and the source, the processing order of each of the plurality of commands from the plurality of processing queues.

19. The system of claim 13, wherein the method further comprises:
for processing each command of the plurality of commands from the plurality of processing queues according to the processing order.

* * * * *